United States Patent
Chen et al.

(10) Patent No.: US 10,460,731 B2
(45) Date of Patent: Oct. 29, 2019

(54) APPARATUS, METHOD, AND NON-TRANSITORY COMPUTER READABLE STORAGE MEDIUM THEREOF FOR GENERATING CONTROL INSTRUCTIONS BASED ON TEXT

(71) Applicant: Institute For Information Industry, Taipei (TW)

(72) Inventors: Pin-Liang Chen, New Taipei (TW); Ping-Che Yang, Taipei (TW); Tsun Ku, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/936,416

(22) Filed: Mar. 26, 2018

(65) Prior Publication Data

US 2019/0164555 A1    May 30, 2019

(30) Foreign Application Priority Data

Nov. 30, 2017   (TW) .............................. 106141878 A

(51) Int. Cl.
*G10L 15/26* (2006.01)
*G10L 15/22* (2006.01)
(Continued)

(52) U.S. Cl.
CPC ............ *G10L 15/26* (2013.01); *G06F 16/353* (2019.01); *G06F 17/2785* (2013.01); *G10L 15/22* (2013.01); *G10L 2015/223* (2013.01)

(58) Field of Classification Search
CPC ... G10L 15/26; G10L 15/22; G10L 2015/223; G06F 16/353; G06F 17/2785
See application file for complete search history.

(56) References Cited

U.S. PATENT DOCUMENTS 5,974,413 A * 10/1999 Beauregard ......... G06F 9/45512
6,658,377 B1 * 12/2003 Anward ................ G06F 17/271
704/9
(Continued)

FOREIGN PATENT DOCUMENTS

CN      105759810 A      7/2016
CN      106095746 A      11/2016
(Continued)

OTHER PUBLICATIONS

Office Action to the corresponding Taiwan Patent Application rendered by the Taiwan Intellectual Property Office (TIPO) dated Oct. 4, 2018, 20 pages (including English translation).

*Primary Examiner* — Mohammad K Islam
(74) *Attorney, Agent, or Firm* — Skaar Ulbrich Macari, P.A.

(57) ABSTRACT

An apparatus, method, and non-transitory computer readable storage medium for generating control instructions based on text are provided. The apparatus analyzes a text with at least one string to generate a text timestamp document, analyzes the at least one string to generate a plurality of pieces of emotion information, a plurality of pieces of action information, and a plurality of pieces of environment information, and decides a plurality of emotion tags and their corresponding timestamps, a plurality of action tags and their corresponding timestamps, and a plurality of environment tags and their corresponding timestamps according to a feature database. The apparatus further generates control instruction(s) and the corresponding timestamp(s) according to the emotion tags and their corresponding timestamps, the action tags and their corresponding timestamps, and the environment tags and their corresponding timestamps.

20 Claims, 5 Drawing Sheets

(51) Int. Cl.
    *G06F 17/27*         (2006.01)
    *G06F 16/35*         (2019.01)

(56) References Cited

U.S. PATENT DOCUMENTS

| | | | | |
|---|---|---|---|---|
| 8,645,134 | B1* | 2/2014 | Harrenstien | G10L 15/26 |
| | | | | 704/235 |
| 8,688,447 | B1* | 4/2014 | De | G10L 15/1815 |
| | | | | 704/231 |
| 9,727,371 | B2* | 8/2017 | Johnson | G06F 9/5027 |
| 10,127,908 | B1* | 11/2018 | Deller | G10L 15/22 |
| 2004/0249650 | A1* | 12/2004 | Freedman | G06Q 30/02 |
| | | | | 705/7.29 |
| 2011/0206198 | A1* | 8/2011 | Freedman | G06Q 30/06 |
| | | | | 379/265.03 |
| 2014/0052728 | A1* | 2/2014 | Nakazawa | G06F 16/355 |
| | | | | 707/737 |
| 2015/0242391 | A1* | 8/2015 | Goel | G06F 17/2785 |
| | | | | 704/9 |
| 2015/0332666 | A1 | 11/2015 | Dayan et al. | |
| 2016/0132591 | A1 | 5/2016 | Clark et al. | |
| 2017/0010860 | A1* | 1/2017 | Henniger | G06F 3/167 |
| 2017/0060996 | A1 | 3/2017 | Das | |
| 2017/0103755 | A1* | 4/2017 | Jeon | G10L 15/22 |
| 2017/0308523 | A1 | 10/2017 | Wang et al. | |
| 2018/0233150 | A1* | 8/2018 | Gruenstein | G10L 15/265 |
| 2018/0268298 | A1* | 9/2018 | Johansen | G06N 3/0454 |
| 2018/0293978 | A1* | 10/2018 | Sinha | G06F 17/2785 |
| 2018/0308487 | A1* | 10/2018 | Goel | G10L 15/1815 |
| 2018/0329886 | A1* | 11/2018 | Li | G06F 17/2785 |

FOREIGN PATENT DOCUMENTS

| | | |
|---|---|---|
| CN | 107193969 A | 9/2017 |
| TW | 201416887 A | 5/2014 |

* cited by examiner

| Control instructions | To-be-controlled devices | Emotion tag | Environment tag | Action tag |
|---|---|---|---|---|
| Show a scary expression | Display screen | Scary | | |
| Play a sound effect of typhoon | Loudspeaker | | Wind | |
| Blow air | Fan | | | Blow |

FIG. 3

APPARATUS, METHOD, AND NON-TRANSITORY COMPUTER READABLE STORAGE MEDIUM THEREOF FOR GENERATING CONTROL INSTRUCTIONS BASED ON TEXT

PRIORITY

This application claims priority to Taiwan Patent Application No. 106141878 filed on Nov. 30, 2017, which is hereby incorporated by reference in its entirety.

FIELD

The present disclosure relates to an apparatus, a method, and a non-transitory computer readable storage medium for generating control instructions based on a text. More particularly, the present disclosure relates to an apparatus, a method, and a non-transitory computer readable storage medium for generating control instructions based on emotions, actions, and/or environments involved in a text.

BACKGROUND

Conventional story machines are only capable of playing voices according to contents of a text and are short of a mechanism for interacting with users, so it is hard to draw the attention and arouse the interest of the users. Technologies for performing emotion analysis on the contents of the text are available currently, but these technologies are only capable of performing the emotion analysis on a single sentence of the text and are incapable of considering the overall emotion of a whole paragraph or a whole text. Therefore, when emotion analysis results of the sentences in the text are inconsistent, the actual emotion of the text cannot be determined correctly and expressed fully. Therefore, in the prior art, performing emotion analysis on the text provides a poor effect, and control instructions for controlling a to-be-controlled device cannot be generated automatically according to the analysis results. Moreover, prior art only performs emotion analysis and does not that the actions of the role or the environment in the text into consideration and, therefore, control instructions for actions of a role or the environment cannot be generated.

In different application fields (e.g., the Human Machine Interface), it becomes more and more important to correctly recognize the emotion presented by the text so as to generate control instructions for to-be-controlled devices based on the recognized information and provide appropriate responses and/or services for the users. The conventional emotion analysis technology cannot overcome these problems, so the results of the emotion analysis are not accurate enough. Accordingly, there is an urgent need for a technology which is capable of improving the accuracy in emotion analysis of the text, reducing the inconsistency emotion analysis results on the sentences in the text, and generating control instructions for the text automatically according to the correct analysis results of the text and the to-be-controlled devices.

SUMMARY

The present disclosure provides an apparatus for generating control instructions based on a text. The apparatus for generating control instructions based on a text comprises an input interface, a storage and a processor, and the processor is electrically connected to the input interface and the storage. The input interface is configured to receive a text comprising at least one string. The storage is configured to store a feature database and a control instruction set. The feature database comprises a plurality of preset emotion tags, a plurality of preset action tags, and a plurality of preset environment tags. The control instruction set comprises a plurality of control instructions, wherein each of the control instructions corresponds to at least one of the preset emotion tags, the preset action tags, and the preset environment tags. The processor is configured to analyze the at least one string comprised in the text to generate a text timestamp datum, analyze the at least one string to obtain a plurality of pieces of emotion information, a plurality of pieces of action information, and a plurality of pieces of environment information, decide a plurality of emotion tags and corresponding timestamps thereof, a plurality of action tags and corresponding timestamps thereof, and a plurality of environment tags and corresponding timestamps thereof according to the feature database, and generate at least one control instruction and corresponding at least one timestamp thereof according to the emotion tags and the corresponding timestamps thereof, the action tags and the corresponding timestamps thereof, and the environment tags and the corresponding timestamps thereof. Each of the emotion tags is one of the preset emotion tags, each of the action tags is one of the preset action tags, and each of the environment tags is one of the preset environment tags.

The present disclosure also provides a method for generating control instructions based on a text, and the method is adapted for an electronic computing apparatus. The method for generating control instructions based on a text comprises the following steps: (a) analyzing at least one string comprised in the text to generate a text timestamp datum; (b) analyzing the at least one string comprised in the text to obtain a plurality of pieces of emotion information, a plurality of pieces of action information, and a plurality of pieces of environment information; (c) deciding a plurality of emotion tags and corresponding timestamps thereof, a plurality of action tags and corresponding timestamps thereof, and a plurality of environment tags and corresponding timestamps thereof according to a feature database; and (d) generating at least one control instruction and corresponding at least one timestamp thereof according to the emotion tags and the corresponding timestamps thereof, the action tags and the corresponding timestamps thereof, and the environment tags and the corresponding timestamps thereof.

The present disclosure further provides a non-transitory computer readable storage medium, which comprises a computer program stored therein. When the computer program is loaded into an electronic computing apparatus, the computer program is executed by the electronic computing apparatus to perform the method for generating control instructions based on a text that is described in the above paragraph.

The technology (including the apparatus, the method and the non-transitory computer readable storage medium) for generating control instructions based on a text provided in the present disclosure analyzes a text and utilizes a feature database to decide a plurality of emotion tags and corresponding timestamps thereof, a plurality of action tags and corresponding timestamps thereof, and a plurality of environment tags and corresponding timestamps thereof for the text, and generates control instructions and corresponding timestamps thereof according to the first emotion tags and the corresponding timestamps thereof, the action tags and the corresponding timestamps thereof, and the environment tags and the corresponding timestamps thereof. Therefore, the technology for generating control instructions based on a text provided in the present disclosure can generate control instructions and corresponding timestamps thereof based on the emotion information, the environment information, and the action information comprised in the text so as to improve the effect of interacting with the users.

The technology for generating control instructions based on a text provided in the present disclosure may further adopt a technology of performing emotion labeling in two stages, i.e., an emotion correlation degree is calculated, and then the aforesaid emotion tags are corrected according to the emotion correlation degree. By performing emotion labeling in two stages, the present disclosure can decide emotion tags for a text more accurately, so the inconsistent emotion analysis results of the sentences in the text can be reduced and the emotion analysis result conflict with the contents of the sentences can be reduced. Thus, more accurate results of emotion analysis can be generated, and appropriate control instructions can be generated and transmitted to the to-be-controlled devices to provide more interaction with the users.

BRIEF DESCRIPTION OF THE DRAWINGS

FIG. 3 is a schematic view depicting a control instruction set in an example of the present disclosure;

DETAILED DESCRIPTION

In the following description, the apparatus, the method and the non-transitory computer readable storage medium for generating control instructions based on a text provided in the present disclosure will be explained with reference to example embodiments thereof. However, these example embodiments are not intended to limit the present disclosure to any specific example, embodiment, environment, applications or implementations described in these example embodiments. Therefore, description of these example embodiments is only for purpose of illustration rather than to limit the scope of the present disclosure.

It should be appreciated that, in the following embodiments and the attached drawings, elements unrelated to the present disclosure are omitted from depiction; and dimensions of and dimensional scales among individual elements in the attached drawings are provided only for illustration, but not to limit the scope of the present disclosure.

Figure 1:
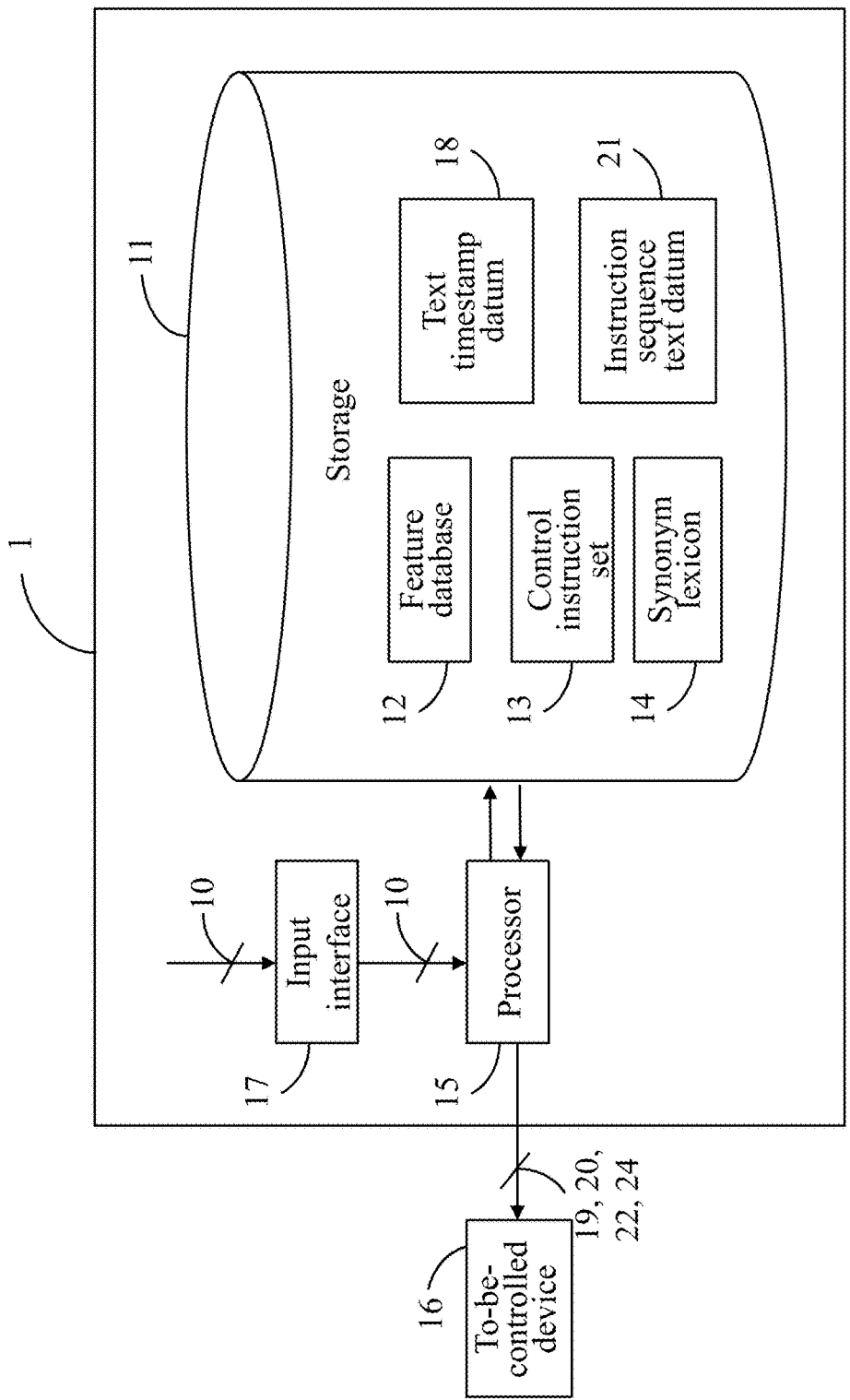
FIG. 1 is a schematic architectural view of an apparatus for generating control instructions based on a text according to the present disclosure.

A first embodiment of the present disclosure provides an apparatus 1 for generating control instructions based on a text, and a schematic architectural view thereof is depicted in FIG. 1. The apparatus 1 for generating control instructions based on a text comprises a storage 11, a processor 15 and an input interface 17. The processor 15 is electrically connected to the storage 11 and the input interface 17, and the processor 15 may be electrically connected to one or more to-be-controlled devices 16.

The storage 11 stores a feature database 12, a control instruction set 13, and a synonym lexicon 14. It shall be appreciated that, in some embodiments, the storage 11 may not store the synonym lexicon 14. The storage 11 may be a memory, a Universal Serial Bus (USB) disk, a hard disk, a compact disk (CD), a mobile disk, a database or any other storage media or circuits with the same function and well known to those skilled in the art. The processor 15 may be any of various processors, central processing units (CPUs), microprocessors or other computing devices known to these of ordinary skill in the art. The input interface 17 may be one of various devices capable of receiving literal information.

Figure 2:
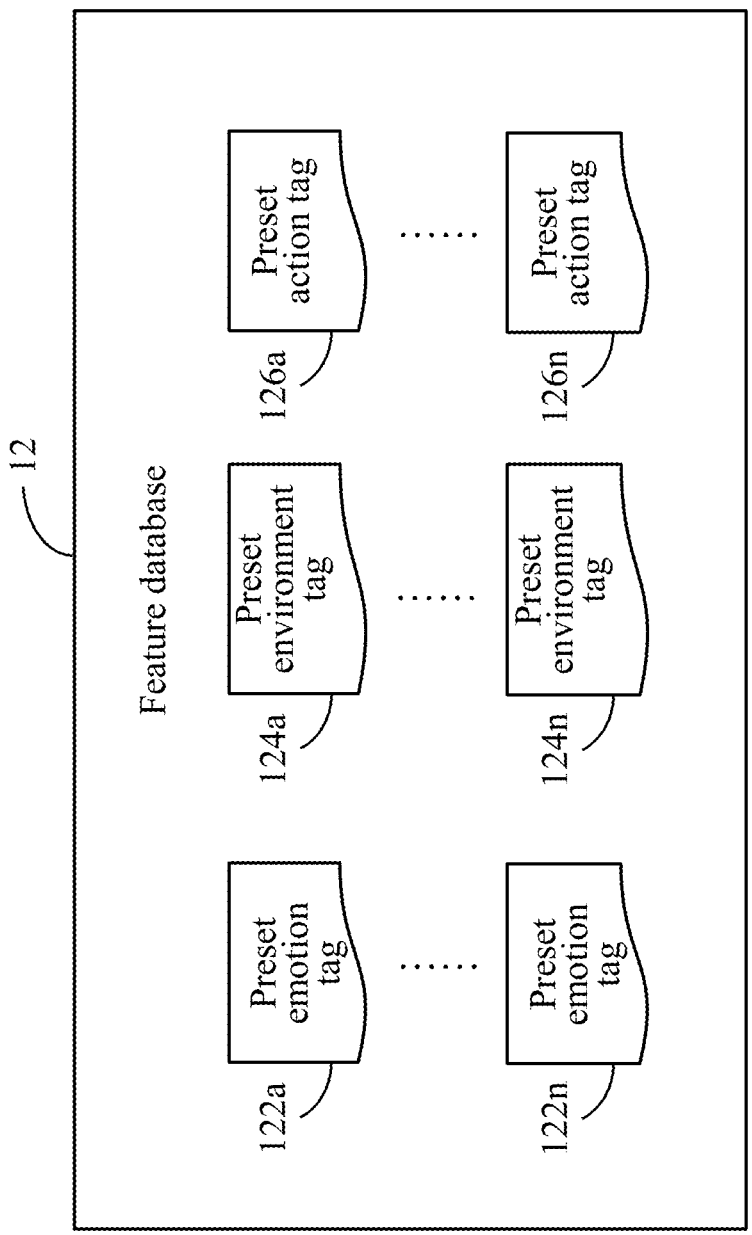
FIG. 2 is a schematic view depicting a feature database in an example of the present disclosure.

FIG. 2 is a schematic view depicting a feature database 12 of the first embodiment, and the feature database 12 comprises a plurality of preset emotion tags 122a, . . . , 122n, a plurality of preset environment tags 124a, . . . , 124n, and a plurality of preset action tags 126a, . . . , 126n. In this embodiment, each of the preset emotion tags 122a, . . . , 122n may be relevant to a piece of emotion information, each of the preset environment tags 124a, . . . , 124n may be relevant to a piece of environment information, and each of the preset action tags 126a, . . . , 126n may be relevant to a piece of action information. For example, six preset emotion tags among the preset emotion tags 122a, . . . , 122n respectively represent six pieces of emotion information of "Angry," "Scary," "Happy," "Sad," "Nervous," and "Surprised."

FIG. 3 is a schematic view depicting the control instruction set 13 of the first embodiment. The control instruction set 13 comprises a plurality of control instructions, and each of the control instructions corresponds to at least one of the preset emotion tags 122a, . . . , 122n, the preset environment tags 124a, . . . , 124n, and the preset action tags 126a, . . . , 126n. For example, a control instruction of "Display a scary expression" may correspond to an emotion tag of "Scary," and a control instruction of "Blow air" may correspond to an action tag of "Blow." Moreover, each of the control instructions corresponds to a to-be-controlled device. When a control instruction is transmitted to a corresponding to-be-controlled device, the to-be-controlled device may execute the control instruction to interact with the user. For example, when the control instruction of "Blow air" is transmitted to a to-be-controlled device (e.g., a "Fan"), the to-be-controlled device (e.g., the "Fan") blows air in response.

The input interface 17 receives a text 10 comprising at least one string. It shall be appreciated that the preset disclosure does not restrict the source that the input interface 17 can receive the text. For example, the input interface 17 may receive a text inputted by a user from a keyboard or a network. In other embodiments, the apparatus 1 for generating control instructions based on a text may further comprise a voice input interface electrically connected to the processor 15. In these embodiments, the voice input interface may be configured to receive a voice message and transmit the voice message to the processor 15, the processor 15 then recognizes the voice message and converts the voice message into a literal form according to the voice recognition result and, thereby, obtaining the text.

The processor 15 analyzes the at least one string comprised in the text 10 to generate a text timestamp datum 18, and the text timestamp datum 18 may be stored into the storage 11. For example, the text timestamp datum 18 may comprise a time (e.g., a time for which each string is played when the text 10 is played) corresponding to each string (e.g., each string is a sentence, in which words are separated by two separators including a comma, a period, a semicolon or the like). The processor 15 may perform time labeling according to the sequence of the string in the text. It shall be appreciated that the way for time labeling is not limited in the present disclosure, so details thereof will not be further described herein.

In other embodiments, the processor 15 may first perform lexical analysis on the strings comprised in the text 10. In detail, the processor 15 may obtain a plurality of groups after performing word segmentation on each of the strings, and each of the groups may be at least one vocabulary about a role, an action, an environment, or the like. The processor 15 then performs time labeling according to the sequence in which the groups appear in the text 10, thereby generating the text timestamp datum 18. The processor 15 may adopt various word segmentation technologies to perform the aforesaid lexical analysis. For example, the processor 15 may adopt a word segmentation technology based on string matching, a word segmentation technology based on statistics, or a word segmentation technology based on understanding or the like.

The processor also analyzes the at least one string comprised in the text 10 to obtain a plurality of pieces of emotion information, a plurality of pieces of action information, and a plurality of pieces of environment information. For example, the processor 15 may adopt any semantic analysis method to recognize the emotion information, the action information, and/or the environment information in each of the strings. It shall be appreciated that the semantic analysis method is well known to those of ordinary skill in the art, and thus will not be further described herein. In this embodiment, the synonym lexicon 14 stored in the storage 11 stores a plurality of synonyms corresponding to the emotion information, a plurality of synonyms corresponding to the environment information, and a plurality of synonyms corresponding to the action information. Therefore, in this embodiment, the processor 15 can obtain the emotion information, the action information, and the environment information directly or obtain the emotion information, the action information, and the environment information by querying the synonym lexicon 14 after analyzing the at least one string comprised in the text 10.

In this embodiment, the processor 15 further decides a plurality of first emotion tags and corresponding timestamps thereof, a plurality of action tags and corresponding timestamps thereof, and a plurality of environment tags and corresponding timestamps thereof for the text 10 according to the feature database 12 (e.g., decides the tags according to the emotion information, the action information, and the environment information obtained by analyzing the text 10 with reference to the feature database 12, and decides the timestamps corresponding to the tags with reference to the text timestamp datum 18). It shall be appreciated that each of the first emotion tags is one of the preset emotion tags 122a, . . . , 122n, each of the action tags is one of the preset action tags 124a, . . . , 124n, and each of the environment tags is one of the preset environment tags 126a, . . . , 126n.

Next, the processor 15 generates at least one first control instruction and corresponding at least one timestamp thereof according to the first emotion tags and the corresponding timestamps thereof, the action tags and the corresponding timestamps thereof, and the environment tags and the corresponding timestamps thereof (e.g., decides the at least one first control instruction according to the first emotion tags, the action tags and the environment tags with reference to the control instruction set 13, and decides the at least one timestamp corresponding to the at least one first control instruction according to the timestamps corresponding to the tags).

Thereafter, the apparatus 1 for generating control instructions based on a text may operate according to the at least one first control instruction and corresponding at least one timestamp thereof when it plays the text 10. For example, each of the first control instructions may comprise a to-be-controlled device datum and an execution instruction. The to-be-controlled device datum comprises the to-be-controlled device 16 and an execution instruction to be executed by the to-be-controlled device 16. Through the aforesaid operation, the effect of interacting with the users can be improved when the apparatus 1 for generating control instructions based on a text plays the text 10.

In other embodiments, the processor 15 performs emotion labeling on the at least one string comprised in the text 10 in two stages. Generally speaking, when performing emotion labeling in the first stage, the processor 15 decides a plurality of first emotion tags and corresponding timestamps thereof, a plurality of environment tags and corresponding timestamps thereof, and a plurality of action tags and corresponding timestamps thereof for the text 10 according to the feature database 12. When performing emotion labeling in the second stage, the processor 15 calculates an emotion correlation degree between the result of emotion labeling in the first stage and at least one role recorded by the text 10, and then corrects the first emotion tags into a plurality of second emotion tags according to the emotion correlation degree. It shall be appreciated that each of the second emotion tags is one of the preset emotion tags. In these embodiments, the processor 15 generates the at least one first control instruction and the corresponding at least one timestamp thereof according to the second emotion tags and the corresponding timestamps thereof, the action tags and the corresponding timestamps thereof, and the environment tags and the corresponding timestamps thereof. This will be described in detail hereinafter.

In the first stage of emotion labeling, the processor 15 decides a plurality of first emotion tags and corresponding timestamps thereof, a plurality of environment tags and corresponding timestamps thereof, and a plurality of action tags and corresponding timestamps thereof for the text 10 according to the feature database 12. In detail, the processor 15 utilizes the text timestamp datum 18 obtained through the above analysis to decide the first emotion tags and corresponding timestamps thereof, the environment tags and corresponding timestamps thereof, and the action tags and corresponding timestamps thereof for the text 10 according to the emotion information, the action information, and the environment information with reference to the feature database 12. It shall be appreciated that the order in which the first emotion tags, the environment tags, and the action tags are decided by the processor 15 is not limited in the present disclosure. In some embodiments, the processor 15 may first decide the environment tags and the action tags and then decide the first emotion tags of the text 10.

It shall be appreciated that, in an embodiment in which emotion labeling is performed twice, the text records at least one role, each of the first emotion tags corresponds to one of the at least one role, and each of action tags corresponds to one of the at least one role. The processor 15 may recognize the at least one role recorded in the at least one string of the text 10 by any analysis method. Each of the at least one role may be a subject in a string/sentence, and even may be a subject having an action or emotion. For ease of understanding, an example will be described hereby, but the example is not intended to limit the scope of the present disclosure. Here it is assumed that the text 10 comprises a string having the content "A scary big wild wolf swallowed down the grandma in one gulp, and then put on the clothes of the grandma." The role obtained by the processor 15 after analyzing the string is the "Big wild wolf" (i.e., the subject of the string/sentence), and the emotion information corresponding to the role is "Scary." The processor 15 decides that the first emotion tag of the string is "Scary" according to the feature database 12, decides the timestamp corresponding to the first emotion tag according to the text timestamp datum 18, and labels the role (i.e., the "Big wild wolf") as corresponding to the first emotion tag (i.e., "Scary").

Next, the processor 15 calculates an emotion correlation degree between according to the first emotion tags and the corresponding timestamps thereof, the action tags and the corresponding timestamps thereof, the environment tags and the corresponding timestamps thereof, and the at least one role recorded by the text 10, and then the processor 15 corrects the first emotion tags into a plurality of second emotion tags according to the emotion correlation degree.

In some embodiments, the processor 15 may represent each of the strings comprised in the text 10 by a vector, and each vector comprises the first emotion tag, the environment tag, the action tag, and/or the role of the string corresponding to the vector. The processor 15 arranges the at least one vector according to the sequence of the at least one string in the text 10, and calculates the emotion correlation degree in consideration of the sequence of each of the at least one string/vector. In some embodiments, the emotion correlation degree may be a model, and the processor 15 utilizes the model to calculate a second emotion tag for the string comprising the first emotion tag (i.e., correct the first emotion tag of a string into a second emotion tag). In some embodiments, the processor 15 may adopt a Deep Learning method (e.g., a Recurrent Neutral Network) to analyze the first emotion tags and the corresponding timestamps thereof, the environment tags and the corresponding timestamps thereof, the action tags and the corresponding timestamps thereof, and the at least one role, thereby calculating the emotion correlation degree. It shall be appreciated that the aforesaid Deep Learning Network is a technology well known to those of ordinary skill in the art, and thus operation thereof will not be further described herein. Therefore, in the embodiments of the present disclosure, the first emotion tags of the text 10 are modified into the second emotion tags by calculating an emotion correlation degree. Each of the first emotion tags may be the same as or different from the corresponding second emotion tag.

For ease of understanding, an example will be illustrated hereby, which, however, is not intended to limit the scope of the present disclosure. It is assumed that the text 10 comprises two strings, wherein the first string has the content "A scary big wild wolf swallowed down the grandma in one gulp" and the second string has the content "The big wild wolf happily said: only in this way can I hear the sweet voice of the little red hood clearly." The text timestamp datum 18 obtained by the processor 15 after analyzing the two strings of the text 10 comprises the aforesaid first string and the corresponding timestamp thereof (e.g., the $2^{nd}$ second) and the aforesaid second string and the corresponding timestamp thereof (e.g., the $30^{th}$ second). Moreover, the processor 15 obtains a role (i.e., the "Big wild wolf") and a piece of emotion information (i.e., "Scary") after analyzing the first string, and obtains a role (i.e., the "Big wild wolf") and a piece of emotion information (i.e., "Happily") after analyzing the second string. The processor 15 decides the first emotion tag (i.e., "Scary") of the first string and the corresponding timestamp thereof (i.e., the $2^{nd}$ second) and the first emotion tag (i.e., "Happy") of the second string and the corresponding timestamp thereof (i.e., the $30^{th}$ second) according to the feature database 12 with reference to the text timestamp datum 18.

Next, the processor 15 calculates an emotion correlation degree between the first emotion tags (i.e., "Scary" and "Happy") and the corresponding timestamps thereof (i.e., the $2^{nd}$ second and the $30^{th}$ second). The processor 15 may form a vector by using the role (i.e., the "Big wild wolf") and the first emotion tag (i.e., "Scary") of the first string, form another vector by using the role (i.e., the "Big wild wolf") and the first emotion tag (i.e., "Happy") of the second string, arrange the two vectors according to the timestamps, and utilize the Deep Learning Network to calculate the emotion correlation degree for the two vectors. The processor 15 calculates that the second emotion tags of the first string and the second string are all "Scary" according to the emotion correlation degree. Through the emotion labeling in the second stage, the first emotion tag of the second string (i.e., "Happy") is corrected into the second emotion tag (i.e., "Scary"). According to the above descriptions, the processor 15 can correct the first emotion tag that is misjudged in the first stage of emotion labeling into the correct second emotion tag by calculating an emotion correlation degree.

In some embodiments, the processor 15 further calculates an instruction sequence text datum 21 according to the text timestamp datum 18, each of the second emotion tags and the corresponding timestamp thereof, each of the action tags and the corresponding timestamp thereof, each of the environment tags and the corresponding timestamp thereof, and the control instruction set 13. The instruction sequence text datum 21 comprises a plurality of second control instructions 20 corresponding to the second emotion tags respectively and a plurality of corresponding timestamps thereof, a plurality of third control instructions 22 corresponding to the action tags respectively and a plurality of corresponding timestamps thereof, and a plurality of fourth control instructions 24 corresponding to the environment tags respectively and a plurality of corresponding timestamps thereof. The instruction sequence text 21 may be stored in the storage 11.

In other embodiments, each of the second control instructions 20, the third control instructions 22, and the fourth control instructions 24 comprises a to-be-controlled device datum and an execution instruction. The to-be-controlled device datum comprises the to-be-controlled device 16 and the execution instruction to be executed by the to-be-controlled device 16. In these embodiments, when a user selects an instruction sequence text 21 (e.g., via the input interface 17) to be played by the apparatus 1, the processor 15 analyzes the instruction sequence text 21 and transmits control instructions 19, 20, 22, and 24 to corresponding to-be-controlled devices sequentially according to the timestamps. After receiving the control instructions, the to-be-controlled devices operate accordingly.

It shall be appreciated that, in other embodiments, the processor 15 may not limit the second emotion tags, the action tags, and the environment tags as corresponding to the second control instructions, the third control instructions, and the fourth control instructions in one to one correspondence. In other words, in these embodiments, one emotion/action/environment tag may correspond to one or more control instructions, and one control instruction may correspond to one or more emotion/action/environment tags. Additionally, the categories of the to-be-controlled devices 16 are not limited in the present disclosure. The to-be-controlled devices 16 may be various devices capable of expressing information about auditory sense, visual sense, feeling, tactile sense, or the like to the users. For example, the to-be-controlled devices 16 may be a display screen, a loudspeaker, an air conditioner, a tactile sensing device, a fan, a temperature controller, a computer device, or the like.

For ease of understanding, an example will be illustrated hereby, which, however, is not intended to limit the scope of the present disclosure. Please refer to FIG. 3 together. Herein, it is assumed that the instruction sequence text 21 obtained by the processor 15 after performing the aforesaid operations comprises the second control instruction (e.g., "Show a scary expression") corresponding to the second emotion tag (e.g., "Scary") and the corresponding timestamp thereof (e.g., the $2^{nd}$ second), the fourth control instruction (e.g., "Play a sound effect of typhoon") corresponding to the environment tag (e.g., "Wind") and the corresponding timestamp thereof (e.g., the $60^{th}$ second), and the third control instruction (e.g., "Blow air") corresponding to the action tag (e.g., "Blow") and the corresponding timestamp thereof (e.g., the $15^{th}$ second). If the user selects the instruction sequence text 21 to be played by the apparatus 1, the processor 15 transmits the second control instruction 20 to the display screen at the $2^{nd}$ second so that the display screen executes the second control instruction of "Show a scary expression," transmits the third control instruction 24 to the loudspeaker at the $15^{th}$ second so that the loudspeaker executes the third control instruction of "Play a sound effect of typhoon," and transmits the fourth control instruction 22 to the fan at the $60^{th}$ second so that the fan executes the fourth control instruction of "Blow air".

In other embodiments, the input interface 17 further receives a response signal (e.g., inputted by the user), and the processor 15 further modifies one of the at least one first control instruction and the at least one corresponding timestamp thereof according to the response signal. In some embodiments, the input interface 17 may further receive other response signals, and the processor 15 may further modify any of the first control instructions, the second control instructions, the third control instructions, and the fourth control instructions and the at least one corresponding timestamp thereof according to the other response signals. It shall be appreciated that, in some embodiments, the input interface receiving the response signal may be different from the input interface 17 receiving the text 10.

From the above descriptions, the apparatus 1 for generating control instructions based on a text analyzes the text 10 to obtain a plurality of first emotion tags and corresponding timestamps thereof, a plurality of action tags and corresponding timestamps thereof, and a plurality of environment tags and corresponding timestamps thereof, and generates control instructions and corresponding timestamps thereof according to the first emotion tags and the corresponding timestamps thereof, the action tags and the corresponding timestamps thereof, and the environment tags and the corresponding timestamps thereof.

The apparatus 1 for generating control instructions based on a text may further calculate an emotion correlation degree between the first emotion tags and the corresponding timestamps thereof, the environment tags and the corresponding timestamps thereof, the action tags and the corresponding timestamps thereof, and the at least one role, and decide a plurality of second emotion tags and corresponding timestamps thereof according to the emotion correlation degree. In other words, the apparatus 1 for generating control instructions based on a text may correct the first emotion tags into the second emotion tags according to the emotion correlation degree.

According to the above descriptions, the apparatus 1 for generating control instructions based on a text provided in the present disclosure may analyze the emotion information, the environment information, and the action information comprised in the text, and generate control instructions and corresponding timestamps thereof accordingly. Moreover, the apparatus 1 for generating control instructions based on a text provided in the present disclosure may again generate control instructions and corresponding timestamps thereof after integrating results of emotion analysis in two stages. Therefore, the present disclosure can overcome the problem of inconsistent emotion analysis results on the sentences in the text as well as the problem that the emotion analysis result conflict with the contents of the sentences in the prior art and, thereby, determine the emotion information, the environment information, and the action information comprised in the text more accurately.

Figure 4:
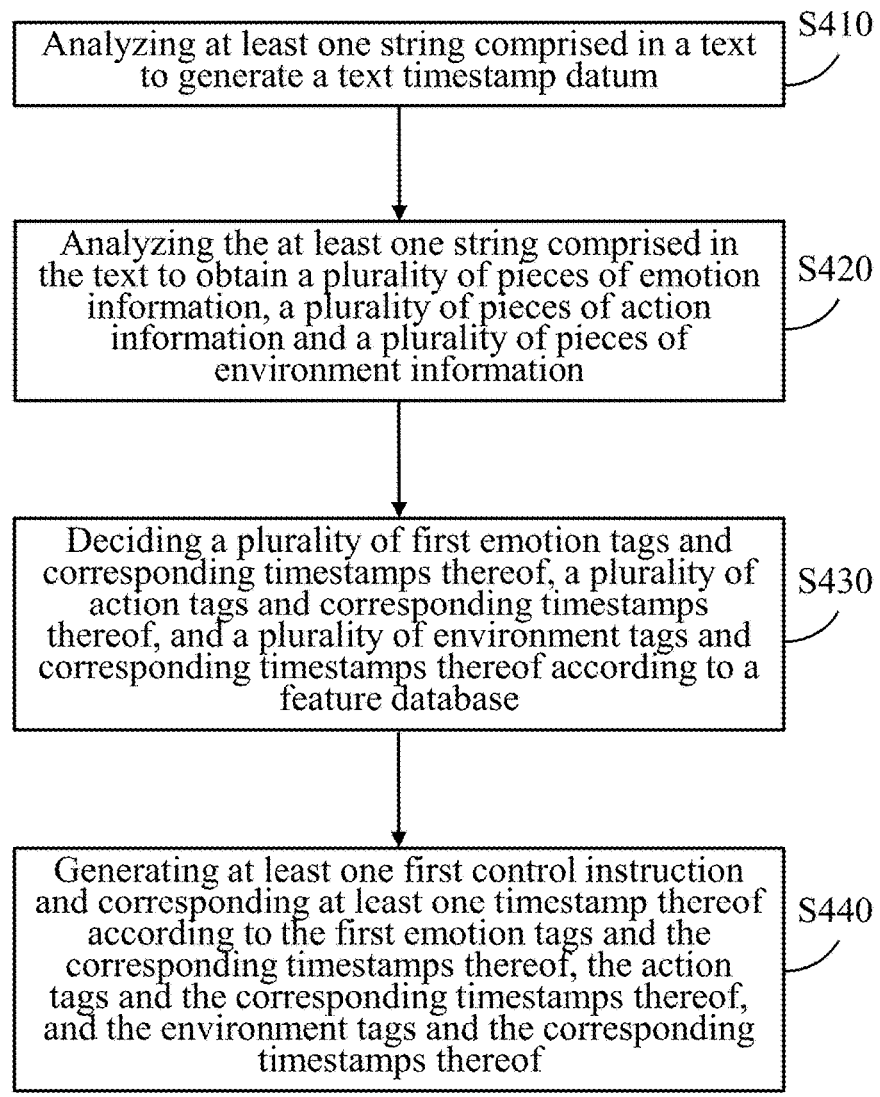
FIG. 4 is a flowchart diagram of a second embodiment of the present disclosure.

A second embodiment of the present disclosure is a method for generating control instructions based on a text, and a flowchart thereof is depicted in FIG. 4. The method for generating control instructions based on a text is adapted for an electronic computing apparatus (e.g., the apparatus 1 for generating control instructions based on a text in the first embodiment).

In this embodiment, the electronic computing apparatus has obtained a text. In some embodiments, the method for generating control instructions based on a text may execute a step to receive a voice message via a voice input interface (e.g., a voice input interface comprised in the electronic computing apparatus), and then execute another step to recognize the voice message by the electronic computing apparatus to obtain the text.

After obtaining the text, the method for generating control instructions based on a text executes step S410 to analyze, by the electronic computing apparatus, at least one string comprised in the text to generate a text timestamp datum 18. Moreover, in step S420, the at least one string comprised in the text is analyzed by the electronic computing apparatus to obtain a plurality of pieces of first emotion information, a plurality of pieces of action information, and a plurality of pieces of environment information. It shall be appreciated that the order to execute the steps S410 and S420 is not limited in this embodiment. In other words, in some embodiments, the step S420 may be executed before the step S410, or the step S410 and the step S420 may be executed simultaneously.

Next, in step S430, a plurality of first emotion tags and corresponding timestamps thereof, a plurality of action tags and corresponding timestamps thereof, and a plurality of environment tags and corresponding timestamps thereof are decided by the electronic computing apparatus according to a feature database (e.g., the feature database 12 described in the first embodiment). It shall be appreciated that the order to decide the first emotion tags, the environment tags, and the action tags is not limited in this embodiment.

Thereafter, in step S440, at least one first control instruction and corresponding at least one timestamp thereof are generated by the electronic computing apparatus according to the first emotion tags and the corresponding timestamps thereof, the action tags and the corresponding timestamps thereof, and the environment tags and the corresponding timestamps thereof. Please note that based on the technology of the present disclosure, the method for generating control instructions based on a text needs to execute the step S430 to decide the emotion tags, the action tags, and the environment tags and the corresponding timestamps thereof for the text before executing the step S440 to generate the at least one first control instruction and the corresponding at least one timestamp thereof according to the various tags and the corresponding timestamps thereof.

Figure 5:
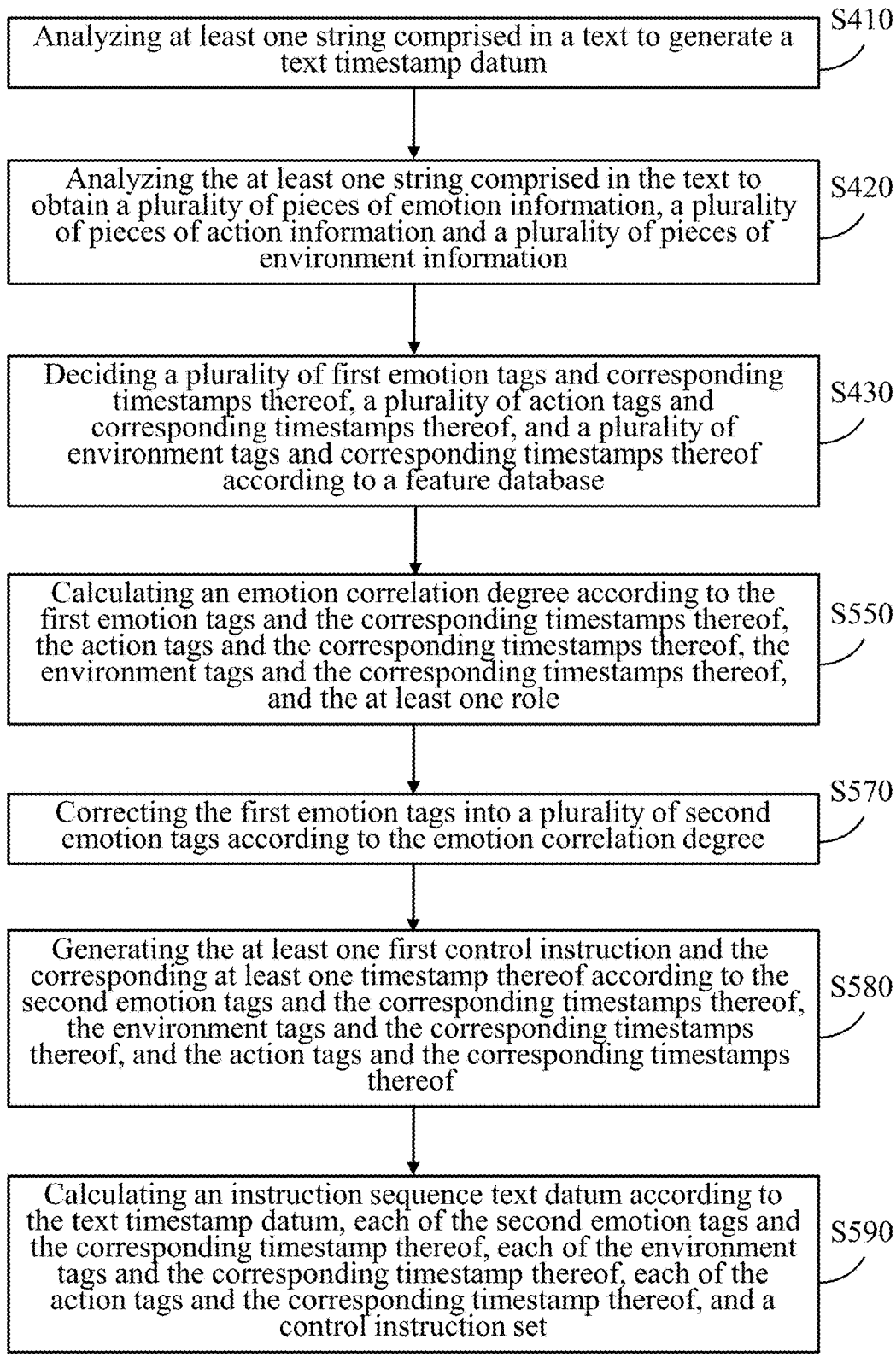
FIG. 5 is a flowchart diagram of a third embodiment of the present disclosure.

A third embodiment of the present disclosure is a method for generating control instructions based on a text, and a flowchart thereof is depicted in FIG. 5. The method for generating control instructions based on a text is adapted for an electronic computing apparatus (e.g., the apparatus 1 for generating control instructions based on a text in the first embodiment). Similarly, in this embodiment, the electronic computing apparatus has obtained a text. In some embodiments, the method for generating control instructions based on a text may execute a step to receive a voice message via a voice input interface (e.g., a voice input interface comprised in the electronic computing apparatus), and then execute another step to recognize the voice message by the electronic computing apparatus to obtain the text.

In this embodiment, the method for generating control instructions based on a text first executes the step S410, the step S420, and the step S430. These steps are the same as those described in the second embodiment, and thus will not be further described herein.

In this embodiment, the text records at least one role, each of the first emotion tags corresponds to at least one role, and each of the action tags corresponds to at least one role. In step S550, an emotion correlation degree is calculated by the electronic computing apparatus according to the first emotion tags and the corresponding timestamps thereof, the environment tags and the corresponding timestamps thereof, the action tags and the corresponding timestamps thereof, and the at least one role.

Thereafter, in step S570, the first emotion tags are corrected into a plurality of second emotion tags by the electronic computing apparatus according to the emotion correlation degree. In step S580, at least one first control instruction and corresponding at least one timestamp thereof are generated by the electronic computing apparatus according to the second emotion tags and the corresponding timestamps thereof, the environment tags and the corresponding timestamps thereof, and the action tags and the corresponding timestamps thereof.

In some embodiments, the method for generating control instructions based on a text may further execute step S590 to calculate an instruction sequence text by the electronic computing apparatus according to the text timestamp datum, each of the second emotion tags and the corresponding timestamp thereof, each of the environment tags and the corresponding timestamp thereof, each of the action tags and the corresponding timestamp thereof, and a control instruction set. The instruction sequence text comprises a plurality of second control instructions corresponding to the second emotion tags respectively and a plurality of corresponding timestamps thereof, a plurality of third control instructions corresponding to the action tags respectively and a plurality of corresponding timestamps thereof, and a plurality of fourth control instructions corresponding to the environment tags respectively and a plurality of corresponding timestamps thereof. Each of the second control instructions, the third control instructions, and the fourth control instructions described above comprises a to-be-controlled device datum and an execution instruction.

In some embodiments, the method for generating control instructions based on a text may further enable the electronic computing apparatus to execute a step to receive a response signal, and then enable the electronic computing apparatus to execute another step to modify one of the at least one first control instruction and the corresponding timestamp thereof according to the response signal.

Please note that according to the technology of the present disclosure, the method for generating control instructions based on a text needs to execute the step S430 to decide the emotion tags, the action tags and the environment tags and the corresponding timestamps thereof for the text before executing the steps S580 and S590 to decide various control instructions according to the various tags and the corresponding timestamps thereof described above.

In addition to the aforesaid steps, the second embodiment and the third embodiment can also execute all the operations and steps set forth in the first embodiment, have the same functions, and deliver the same technical effects as the first embodiment. How the second embodiment and the third embodiment execute these operations and steps, have the same functions and deliver the same technical effects as the first embodiment will be readily appreciated by those of ordinary skill in the art based on the explanation of the first embodiment, and thus will not be further described herein.

The method for generating control instructions based on a text described in each of the second embodiment and the third embodiment may be implemented by a computer program comprising a plurality of codes. The computer program may be stored in a non-transitory computer readable storage medium. After the codes of the computer program are loaded into an electronic computing apparatus (e.g., the apparatus 1 for generating control instructions based on a text), the computer program executes the methods for generating control instructions based on a text as described in the second embodiment and the third embodiment. The non-transitory computer readable storage medium may be an electronic product, e.g., a read only memory (ROM), a flash memory, a floppy disk, a hard disk, a compact disk (CD), a mobile disk, a tape, a database accessible to networks, or any other storage medium with the same function and well known to those of ordinary skill in the art.

According to the above descriptions, the technology (including the apparatus, the method, and the non-transitory computer readable storage medium thereof) for generating control instructions based on a text provide in the present disclosure analyzes a text to obtain a plurality of first emotion tags and corresponding timestamps thereof, a plurality of action tags and corresponding timestamps thereof, and a plurality of environment tags and corresponding timestamps thereof, and generates control instructions and corresponding timestamps thereof according to the first emotion tags and the corresponding timestamps thereof, the action tags and the corresponding timestamps thereof, and the environment tags and the corresponding timestamps thereof.

The technology for generating control instructions based on a text provide in the present disclosure further calculates an emotion correlation degree, and corrects the first emotion tags into the second emotion tags according to the emotion correlation degree. By performing emotion labeling on a text in two stages, the present disclosure can overcome the problem of inconsistent emotion analysis results of the sentences in the text as well as the problem that the emotion analysis result conflict with the contents of the sentences in the prior art.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

What is claimed is:

1. An apparatus for generating control instructions for playing a text, comprising:
   an input interface, being configured to receive the text comprising at least one string;
   a storage, being configured to store a feature database and a control instruction set, wherein the feature database comprises a plurality of preset emotion tags, a plurality of preset action tags, and a plurality of preset environment tags, the control instruction set comprises a plurality of control instructions, and each of the control instructions corresponds to at least one of the preset emotion tags, the preset action tags, and the preset environment tags; and
   a processor electrically connected to the input interface and the storage, being configured to analyze the at least one string comprised in the text to generate a text timestamp datum, wherein the text timestamp datum comprises at least one time for playing the at least one string respectively, and the processor further analyzes the at least one string to obtain a plurality of pieces of emotion information, a plurality of pieces of action information, and a plurality of pieces of environment information, decide a plurality of first emotion tags and corresponding timestamps thereof, a plurality of action tags and corresponding timestamps thereof, and a plurality of environment tags and corresponding timestamps thereof for the text according to the feature database and the text timestamp datum, and generate at least one first control instruction and corresponding at least one timestamp thereof for playing the text according to the first emotion tags and the corresponding timestamps thereof, the action tags and the corresponding timestamps thereof, and the environment tags and the corresponding timestamps thereof,
   wherein each of the first emotion tags is one of the preset emotion tags, each of the action tags is one of the preset action tags, and each of the environment tags is one of the preset environment tags.

2. The apparatus for generating control instructions for playing a text of claim 1, wherein the text records at least one role, each of the first emotion tags corresponds to one of the at least one role, and each of the action tags corresponds to one of the at least one role.

3. The apparatus for generating control instructions for playing a text of claim 2, wherein the processor further calculates an emotion correlation degree between the first emotion tags and the corresponding timestamps thereof, the action tags and the corresponding timestamps thereof, and the environment tags and the corresponding timestamps thereof corresponds to one of the at least one role, and the processor further corrects the first emotion tags into a plurality of second emotion tags according to the emotion correlation degree, each of the second emotion tags is one of the preset emotion tags, and the processor generates the at least one first control instruction and the corresponding at least one timestamp thereof according to the second emotion tags and the corresponding timestamps thereof, the action tags and the corresponding timestamps thereof, and the environment tags and the corresponding timestamps thereof.

4. The apparatus for generating control instructions for playing a text of claim 3, wherein the processor further calculates an instruction sequence text datum according to the text timestamp datum, each of the second emotion tags and the corresponding timestamp thereof, each of the action tags and the corresponding timestamp thereof, each of the environment tags and the corresponding timestamp thereof, and the control instruction set, wherein the instruction sequence text datum comprises a plurality of second control instructions corresponding to the second emotion tags respectively and a plurality of corresponding timestamps thereof, a plurality of third control instructions corresponding to the action tags respectively and a plurality of corresponding timestamps thereof, and a plurality of fourth control instructions corresponding to the environment tags respectively and a plurality of corresponding timestamps thereof, and the storage further stores the instruction sequence text datum.

5. The apparatus for generating control instructions for playing a text of claim 1, further comprising:
   a voice input interface electrically connected to the processor, being configured to receive a voice message,
   wherein the processor further recognizes the voice message to obtain the text.

6. The apparatus for generating control instructions for playing a text of claim 4, wherein each of the second control instructions, the third control instructions, and the fourth control instructions comprises a to-be-controlled device datum and an execution instruction.

7. The apparatus for generating control instructions for playing a text of claim 1, wherein the processor further modifies one of the at least one first control instruction and the corresponding timestamp thereof according to a response signal.

8. A method for generating control instructions for playing a text, being adapted for an electronic computing apparatus, and the method comprising:
   (a) analyzing at least one string comprised in the text to generate a text timestamp datum, wherein the text timestamp datum comprises at least one time for playing the at least one string respectively;
   (b) analyzing the at least one string comprised in the text to obtain a plurality of pieces of emotion information, a plurality of pieces of action information, and a plurality of pieces of environment information;
   (c) deciding a plurality of first emotion tags and corresponding timestamps thereof, a plurality of action tags and corresponding timestamps thereof, and a plurality of environment tags and corresponding timestamps thereof for the text according to a feature database and the text timestamp datum; and
   (d) generating at least one first control instruction and corresponding at least one timestamp thereof for playing the text according to the first emotion tags and the corresponding timestamps thereof, the action tags and the corresponding timestamps thereof, and the environment tags and the corresponding timestamps thereof.

9. The method for generating control instructions for playing a text of claim 8, wherein the text records at least one role, each of the first emotion tags corresponds to one of the at least one role, and each of the action tags corresponds to one of the at least one role.

10. The method for generating control instructions for playing a text of claim 9, wherein the step (d) comprises:
    calculating an emotion correlation degree between the first emotion tags and the corresponding timestamps thereof, the action tags and the corresponding timestamps thereof, the environment tags and the corresponding timestamps thereof, and the at least one role;

correcting the first emotion tags into a plurality of second emotion tags according to the emotion correlation degree; and generating the at least one first control instruction and the corresponding at least one timestamp thereof according to the second emotion tags and the corresponding timestamps thereof, the action tags and the corresponding timestamps thereof, and the environment tags and the corresponding timestamps thereof.

11. The method for generating control instructions for playing a text of claim 10, further comprising:

calculating an instruction sequence text datum according to the text timestamp datum, each of the second emotion tags and the corresponding timestamp thereof, each of the action tags and the corresponding timestamp thereof, each of the environment tags and the corresponding timestamp thereof, and the control instruction set, wherein the instruction sequence text datum comprises a plurality of second control instructions corresponding to the second emotion tags respectively and a plurality of corresponding timestamps thereof, a plurality of third control instructions corresponding to the action tags respectively and a plurality of corresponding timestamps thereof, and a plurality of fourth control instructions corresponding to the environment tags respectively and a plurality of corresponding timestamps thereof; and outputting the instruction sequence text datum.

12. The method for generating control instructions for playing a text of claim 8, further comprising:

receiving a voice message; and recognizing the voice message to obtain the text.

13. The method for generating control instructions for playing a text of claim 11, wherein each of the second control instructions, the third control instructions, and the fourth control instructions comprises a to-be-controlled device datum and an execution instruction.

14. The method for generating control instructions for playing a text of claim 8, further comprising:

receiving a response signal; and modifying one of the at least one first control instruction and the corresponding timestamp thereof according to the response signal.

15. A non-transitory computer readable storage medium, having a computer program stored therein, when the computer program is loaded into an electronic computing apparatus, the computer program performs a method for generating control instructions for playing a text, the method comprising:

(a) analyzing at least one string comprised in the text to generate a text timestamp datum, wherein the text timestamp datum comprises at least one time for playing the at least one string respectively;

(b) analyzing the at least one string comprised in the text to obtain a plurality of pieces of emotion information, a plurality of pieces of action information, and a plurality of pieces of environment information;

(c) deciding a plurality of first emotion tags and corresponding timestamps thereof, a plurality of action tags and corresponding timestamps thereof, and a plurality of environment tags and corresponding timestamps thereof for the text according to a feature database and the text timestamp datum; and (d) generating at least one first control instruction and corresponding at least one timestamp thereof for use when playing the text according to the first emotion tags and the corresponding timestamps thereof, the action tags and the corresponding timestamps thereof, and the environment tags and the corresponding timestamps thereof.

16. The non-transitory computer readable storage medium of claim 15, wherein the text records at least one role, each of the first emotion tags corresponds to one of the at least one role, and each of the action tags corresponds to one of the at least one role.

17. The non-transitory computer readable storage medium of claim 16, wherein the step (d) comprises:

calculating an emotion correlation degree between the first emotion tags and the corresponding timestamps thereof, the action tags and the corresponding timestamps thereof, the environment tags and the corresponding timestamps thereof, and the at least one role;

correcting the first emotion tags into a plurality of second emotion tags according to the emotion correlation degree;

generating the at least one first control instruction and the corresponding at least one timestamp thereof according to the second emotion tags and the corresponding timestamps thereof, the action tags and the corresponding timestamps thereof, and the environment tags and the corresponding timestamps thereof.

18. The non-transitory computer readable storage medium of claim 17, wherein the method further comprises:

calculating an instruction sequence text datum according to the text timestamp datum, each of the second emotion tags and the corresponding timestamp thereof, each of the action tags and the corresponding timestamp thereof, each of the environment tags and the corresponding timestamp thereof, and a control instruction set, wherein the instruction sequence text datum comprises a plurality of second control instructions corresponding to the second emotion tags respectively and a plurality of corresponding timestamps thereof, a plurality of third control instructions corresponding to the action tags respectively and a plurality of corresponding timestamps thereof, and a plurality of fourth control instructions corresponding to the environment tags respectively and a plurality of corresponding timestamps thereof; and outputting the instruction sequence text datum.

19. The non-transitory computer readable storage medium of claim 15, wherein the method further comprises:

receiving a voice message; and recognizing the voice message to obtain the text.

20. The non-transitory computer readable storage medium of claim 18, wherein each of the second control instructions, the third control instructions and the fourth control instructions comprises at least one to-be-controlled device datum and an execution instruction.

* * * * *